O. KNOERZER.
AXLE CONSTRUCTION FOR SPRAYERS.
APPLICATION FILED FEB. 8, 1919.

1,332,219.  Patented Mar. 2, 1920.

Witness:
Harry S. Gaither

Inventor:
Otto Knoerzer
by Charles O. Hervey
his Atty

UNITED STATES PATENT OFFICE.

OTTO KNOERZER, OF HAMMOND, INDIANA.

AXLE CONSTRUCTION FOR SPRAYERS.

1,332,219.  Specification of Letters Patent.  Patented Mar. 2, 1920.

Application filed February 8, 1919. Serial No. 275,763.

*To all whom it may concern:*

Be it known that I, OTTO KNOERZER, a citizen of the United States, and a resident of Hammond, Lake county, and State of Indiana, have invented certain new and useful Improvements in Axle Construction for Sprayers, of which the following is declared to be a full, clear, and exact description.

This invention relates to axle construction for sprayers, and its principal object is to provide a simple, rigid and leak-proof axle construction which may be applied to the tanks of sprayers. This invention has been particularly designed for use in connection with power sprayers, such as employ a motor, mounted upon the tank, for furnishing the power for throwing the spray of fluid for a considerable distance away from the device.

The invention consists in the several novel features hereinafter fully set forth and more particularly defined in the claims.

The invention is clearly illustrated in the accompanying drawing, in which:—

Figure 1:
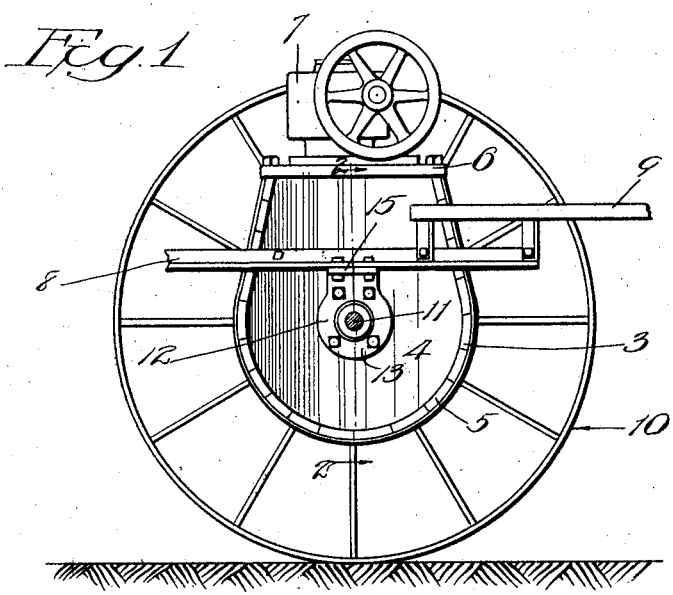
Figure 2:
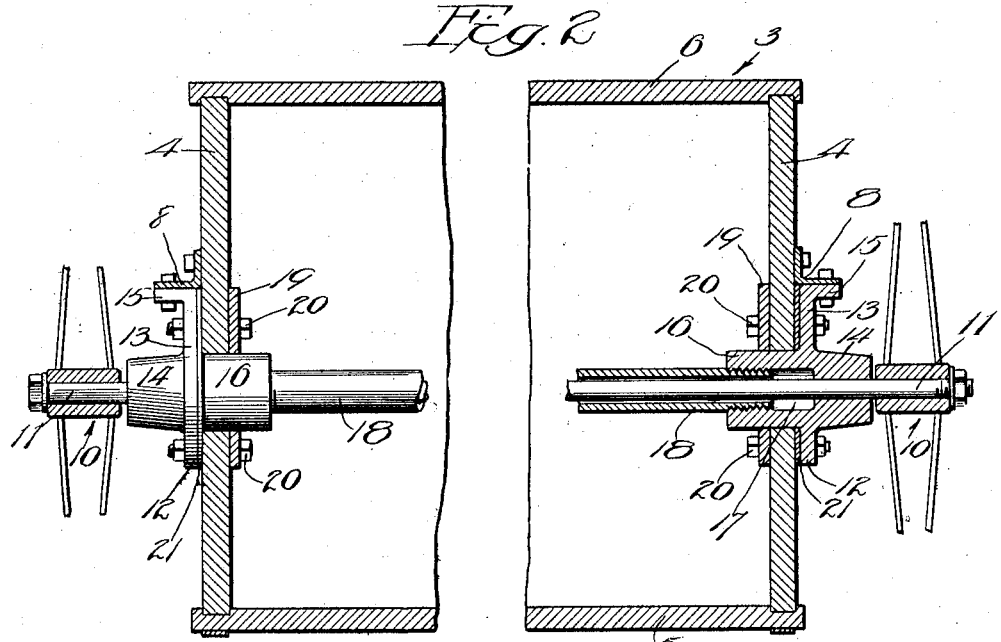

Figure 1 is a side elevation of a power sprayer with the near wheel removed, and showing a simple embodiment of the present invention applied thereto, and Fig. 2 is a detail, vertical section, taken on the line 2—2 of Fig. 1, and showing the axle construction partly in elevation.

Referring to said drawing, the reference character 3, designates a tank for containing the liquid which is to be sprayed upon the plants, and in accordance with the usual practice the tank is made of wood. The end walls or heads 4, of the tank are connected by sides 5, and a top 6, secured together in any suitable and well known manner. Upon the top 6, among other devices, is mounted a motor 7, as for instance a gasolene engine, which is used to furnish power to drive a force pump to distribute the liquid on the plants. Frame members for supporting working parts of the device are illustrated at 8, and the shafts or tongues of the sprayer are attached to said frame members 8, one of which is illustrated at 9. The tank is supported by wheels 10, which are mounted upon an axle or shaft 11, and said axle or shaft extends through the tank from end to end, and may be secured against rotation, if desired, or may be mounted to rotate in its bearings, as is found desirable or necessary, depending upon the type of sprayer upon which it is used.

Secured to each head or end 4, is a bracket 12, which comprises a flat plate-like portion 13, a hub portion 14, a hub extension 16, and a horizontal flange 15. The flange 15, provides means for bolting the frame member 8 and bracket together, and a hub portion 14 receives the axle or shaft 11. The hub extension 16, is alined with the hub portion 14, and extends in through a hole in the end wall or head of the tank, and is made hollow as shown at 17; said hub extension is internally threaded for connection with the threaded end of a tubular member 18, which connects and ties together the hub extensions of both brackets 13. Preferably, a plate 19, is placed against the inner face of each end wall or head 4, and bolts 20, which extend through the plate 19, head 4 and plate-like portion 13, are used for fastening the brackets to the heads. Nuts upon the ends of the bolts 20 are used for clamping the parts together. If desired, gaskets 21, or other packing members may be interposed between the flat portions 13 of the brackets and the outer faces of the heads 4, to insure against leakage.

In mounting the axle construction upon the heads of a tank, the holes for the hub extensions are first made, and one of the brackets secured upon one of the heads. The tube or pipe 18, is then screwed into the other bracket, the pipe inserted through the hole in the other head, inserted into the first named bracket, and the second bracket turned around until the tube is screwed tightly into the hub extension of the first bracket, thereby rigidly connecting the two heads of the tank, after which the bolts 20 are inserted and the nuts are screwed up to securely fasten the brackets to the heads; the shaft or axle may then be inserted through the brackets 12, and connecting tube 18. The wheels are then secured upon the protruding ends of the axle in any suitable manner. Where it is desired to employ the axle for driving any mechanism, it is mounted loosely in the brackets; the wheels may be rigidly or loosely fastened to the axle, as is desired.

From the above, it is obvious that a very simple, substantial and practical construction is embodied in this invention, and that exterior connecting devices between the hubs may be dispensed with. It is also to be observed that the axle may be readily placed approximately at the center of gravity of the device, regardless of the disposition of the load upon the tank, and thus little, if any of the weight thereof is borne by the horse or horses which draw the sprayer.

More or less variation of the exact details of constuction is possible without departing from the spirit of this invention; I desire, therefore, not to limit myself to the exact form of the construction shown and described, but intend, in the following claims to point out all of the invention disclosed herein.

I claim as new, and desire to secure by Letters Patent:

1. In a sprayer, the combination with a tank, of brackets secured to the outer face of the heads thereof, said brackets having alined axle supporting hub portions and internally threaded hub extensions projecting through holes in the heads of the tank, an imperforate pipe having externally threaded end portions secured in said internally threaded hub extensions, and an axle extending through said hub portions, hub extensions and pipe.

2. In a sprayer, the combination with a tank for containing the fluid to be sprayed, of brackets secured to the outer faces of the heads of the tank and having alined hub portions, and internally threaded hub extensions projecting through holes in the heads, an imperforate tubular, connecting member having externally threaded end portions screwed into said internally threaded hub extensions and an axle mounted in said hub portions.

3. In a power sprayer, the combination with a tank for containing the fluid to be sprayed, and frame members, of brackets secured upon the outer faces of the heads of said tank, and formed with flanges bolted to said frame members, said brackets having alined hub portions, and internally threaded hub extensions projecting into the interior of the tank, a pipe screw threaded upon its ends and connecting said hub extensions and an axle mounted in said hub portions.

4. An axle construction for power sprayers, comprising two frame supporting brackets arranged to be secured to the heads of the tank of the sprayer, and each bracket formed with a hub, and with a hub extension projecting in through holes in the heads of the tank, and an imperforate screw threaded tubular member connecting said hub extensions.

Chicago Illinois, February 5th 1919.

OTTO KNOERZER.